United States Patent [19]
Hong et al.

[11] Patent Number: 5,708,657
[45] Date of Patent: Jan. 13, 1998

[54] APPARATUS FOR INTERFACING MOBILE SWITCHING CENTER(MSC) WITH BASE STATION CONTROLLER(BSC) OF CDMA MOBILE SYSTEM

[75] Inventors: Jae-Hwan Hong; Hyeong-Jun Park; Youn-Kwae Jeong; Dong-Jin Shin; Moon-Soo Jang, all of Daejeon, Rep. of Korea

[73] Assignee: Electronics and Telecommunications Research Institute, Daejeon, Rep. of Korea

[21] Appl. No.: 626,427

[22] Filed: Apr. 2, 1996

[51] Int. Cl.$^6$ .................... H04B 7/216; H04J 13/02
[52] U.S. Cl. .................. 370/335; 370/467; 370/342; 379/59; 455/33.1; 455/54.1
[58] Field of Search .................. 370/320, 328, 370/329, 331, 335, 342, 400, 401, 465, 466, 467, 479; 375/205, 206; 455/33.1, 33.2, 34.1, 34.2, 53.1, 54.1, 56.1; 379/58, 59, 60

[56] References Cited

U.S. PATENT DOCUMENTS

| | | | |
|---|---|---|---|
| 5,313,489 | 5/1994 | Menich et al. | 370/335 |
| 5,396,543 | 3/1995 | Beeson, Jr. et al. | 379/59 |
| 5,555,260 | 9/1996 | Rinnback et al. | 370/468 |
| 5,640,386 | 6/1997 | Wiedeman | 370/320 |

*Primary Examiner*—Alpus H. Hsu
*Attorney, Agent, or Firm*—Antonelli, Terry, Stout & Kraus, LLP

[57] ABSTRACT

A base station controller interface of the code division multiple access (CDMA) mobile system is described for interfacing between the base station controller and the CDMA mobile switching center (MSC) of the CDMA mobile system (CMS). The base station controller decreases the load of the system by including, for every base station controller interface, the mobile announcement (MANM) to service the state information of the subscriber of interest for all paging to the mobile subscriber. At the same time, the connection between the base station controller and the base station controller interface of the mobile switching center utilizes the EL 2048 Kbps interfacing technique applying the conventional communication network recommended in the ITU-T. The transmission of the message and the call traffic using the interfacing technique is performed to be linked with the TSB of the base station controller. The control signal for processing the call is accomplished by using the inner communication message protocol which is connected in the EIA-422 interfacing mode to the call control processor of the base station controller. Therefore, the present invention effectively performs the call processing function to the mobile subscriber, the mobility management function, the mobile subscriber announceable function, and the itself operational preservative function. Also, the present invention transmits between the call processing control information and the call traffic. Therefore, the present invention increases the capacity of the subsystem in the conventional full electronic telephone exchanger, and has a effect to easily embody the subsystem in the mobile switching center for more economical connection thereof.

17 Claims, 2 Drawing Sheets

APPARATUS FOR INTERFACING MOBILE SWITCHING CENTER(MSC) WITH BASE STATION CONTROLLER(BSC) OF CDMA MOBILE SYSTEM

TECHNICAL FIELD OF INVENTION

The present invention relates in general to the code division multiple access(CDMA) mobile system, and more particularly to an apparatus for interfacing the base station controller of the CDMA mobile switching center(MSC) for interfacing between the CDMA mobile switching center and the base station controller(BSC).

BACKGROUND OF THE INVENTION

Description of the Prior Art

The MOBILE communication service can generally utilize a time division multiple access(TDMA) mode. A full electronic telephone exchanger using such a mode can transmit information which can include sound as well as type characters, numerical figures, pictures etc. in digital signal form, in which a conventional Time Division Exchanger-10 (TDX-10) full electronic telephone exchanger provides the service by way of an analog mode so that the mobile subscriber which leaves the defined location can be always maintain communication.

However, providing the service in the analog mode has a disadvantage in that the demand of the subscriber can be not satisfied because the frequency thereof is limited. Therefore, there has been developed a CDMA mobile system in order to overcome the disadvantage noted above. FIG. 1 shows the general structure of the CDMA mobile system. The CDMA mobile system comprises the mobile station 4000 which is the terminal providing the mobile communication service for the mobile subscriber; the base transceiver system(BTS) 3000 for performing the RF radio and wired-connection function and which is located between the mobile station and the base station controller(BSC); the base station controller(BSC) 2000 for controlling the wire and radio link connected between the base station 3000 and the CDMA mobile switching center 1000, switching the traffic channel of the packet form, and performing a call process supporting function including the transcoding, the soft hand-off etc., and the mobile switching center(MSC) 1000 having the location register(LR) function which is necessary to track the location information of the mobile communication subscriber for securing the mobility of the subscriber at the same time for performing the network linked function between the stations and the call access and release function between the mobile communication subscriber, the public switch telephone network(PSTN), and the integrated service digital network(ISDN).

The mobile system constructed as the above receives the call from the base station, and then transmits it to the base station controller 2000 if any one of the subscribers is called by the target number through the mobile station 4000 during tracking the location information of the mobile communication subscriber for determining the mobility of the subscriber in the mobile switching center. The base station controller transmits it to the mobile switching center 1000, and the mobile switching center 1000 determines the location of the target mobile station through the base station controller 2000 and the base transceiver station 3000 if the called target number is another mobile station, and links the communication between the called mobile station and the target mobile station if subscribers are within the communication service area. Similarly, the service is provided with the CDMA mobile system by linking the communication between the called mobile station 4000 and the target telephone for linking and calling the public communication network through the base station controller 2000 if the target number is the telephone which is linked with the general public communication network.

Herein, although through the conventional public communication network the state information is serviced to the subscriber of interest for every paging to the mobile communication subscriber, and thus is functional, by one service apparatus, the mobile announcement service which is provided with the public communication network subscriber, the CDMA mobile switching center is the disadvantageous in that the load of the system is too heavy because a large capacity of the mobile announcement and a large capacity of the switch are required due to the congestion of the mobile announceable information for paging if the interface is constructed the same as the mobile switching center for the conventional public communication. Therefore, the CDMA mobile system interface to smooth the mobile announcement service for the paging of all the mobile stations.

SUMMARY OF THE INVENTION

The present invention provides CDMA mobile switching center for interfacing the base station controller and the interface between the base station controllers which is built in the mobile switching center as a subsystem.

It is an object of the invention to determine and more economically interface the enlargement for increasing the capacity of the subsystem of the conventional time division exchanger-10(TDX-10) full electronic telephone exchanger for performing communication between the mobile switching center and the base station controller.

It is another object of the invention to decrease the load of the system by providing the mobile announcement of every base station controller interface, and to provide the interface whose affect the system if decreasing any in generating the defect of the mobile announcement.

It is yet another object of the invention to perform linking up the transmission of the message and the call traffic with the transcoding and selecting bank of the base station controller, and to provide the interface so that the control signal for processing the call to be transmitted uses the inner communication message protocol which is connected to the call control processor of the base station controller in the EIA-422 interfacing mode.

It is a further object of the invention to provide the interface constructed to perform the call process function, the mobility management function, the mobile subscriber announcement and the said operational preservative function for the mobile subscriber.

It is another object of the invention to effectively accomplish the base station controller interface of the CDMA mobile system for effectively transmitting to each other the call process controlling information and the call traffic.

The base station controller interface of the mobile system according to the present invention for accomplishing the objects as mentioned hereinabove is built in the mobile switching center(MSC) to interface between the mobile switching center(MSC) and the mobile station controller. Also, the base station controller interface according to the present invention comprises a large number of the local data link interfaces (LDLI) for providing the communication path connected to the central data link interface(CDLI) and the optic fiber cable to the mobile switching center through the logical and physical connection between the subsystems which is within the mobile switching center. The base station interface also includes a large number of the time switches (TSW) for performing the time slot converting function, the µ/A-law converting function, the A/µ-law converting function and the concentrating function and connected to the local data link interface(LDLI), for transmitting the subscriber data of the time switched sound and non-sound to the local data link interface(LDLI), an E1 mode PCM line and trunk interface are also provided for transmitting traffic for the mobile call by connecting a large number of transcoding and selecting banks a large number of the time switches (TSW) the TSB's being provided in the base station controller(BSC), A mobile local service interface(MLSI) provides a call processing tone for the mobile subscriber for every paging of each mobile call and is connected to the time switch(TSW), A mobile announcement(MANM) performance fixed announceable function for the mobile subscriber for every paging of each mobile call and is connected to the time switch(TSW), A switch and the mobile time local processor(MTLP) for performs the initiative function of the local data link interface(LDLI), the time switch(TSW), and the mobile announcement(MANM), the periodic look up, reoperational and state look up result message transmitting function of the operational state, A line and trunk access processor performs an initiative function of said PCM line and trunk interface, the periodic look up, reoperational and state look up result message transmitting function, A local subsystem network corresponding to a number of the nodes controls the high speed interprocessor communication(IPC) message exchange to perform the high speed message exchange between a number of the processors broken up by connecting said local data link interface, the switch, the mobile local service processor, and the line and trunk access processor, A high speed network management processor performs the system bus look up function, the maintenance function, an IPC processing function and the system bus arbitration associated signal outgoing function, the alarm control processor(ACP) processes the alarm transmitted through the local subsystem network(LSN) by connecting said local subsystem network(LSN), The alarm collection interface(ACI) is provided to input the alarm control processor by collecting information in the subsystems which are connected to said alarm control processor(ACP), and the access switching processor is provided for controlling said switch, the mobile time switch, and local service processor, which are the subordinate processors, the line and trunk access processor(LTAP), and the alarm control processor, and manages the subscriber or the line and trunk in each subsystem, along with accounting data management.

The present invention provided as described above includes the mobile controller interface and, the mobile announcement(MANM) to service the state information of the subscriber of interest to the mobile communication subscriber. Therefore, the present invention can decrease the load of a system, and decrease the effect in the system of generating the defect in the mobile announcement.

The base station controller interface of the CDMA mobile switching center(MSC) according to the present invention is connected between the base station controller and the base station controller(BSC) interface of the mobile switching center(MSC) by the E1 2048 Kbps interfacing techniques which can be applied to the conventional communication network recommended to the International Telecommunication Union-T(ITU-T).

The transmission of the message and the call traffic is performed by using such E1 2048 Kbps interfacing techniques.

Also, the base station interface of the mobile switching center is transmitted the control signal for the call process by using the inner communication message protocol which is connected to the call process processor by way of the Electronic Industries Association(EIA)-422 interfacing mode.

As accomplishing such a transmission, the present invention performs the call process function, the mobility management function, the mobile subscriber announceable function and the self operational preservative function. Also, the present invention can be effectively transmitted between the call process control information and the call traffic.

BRIEF DESCRIPTION OF THE DRAWINGS

Further features and advantages will become more apparent from the following and a more particular description of the preferred embodiment of the invention, as illustrated in the accompanying drawings.

DETAILED DESCRIPTION OF THE INVENTION

Hereinafter, a preferred embodiment of the present invention will be described with reference to the accompanying drawings.

Figure 1:
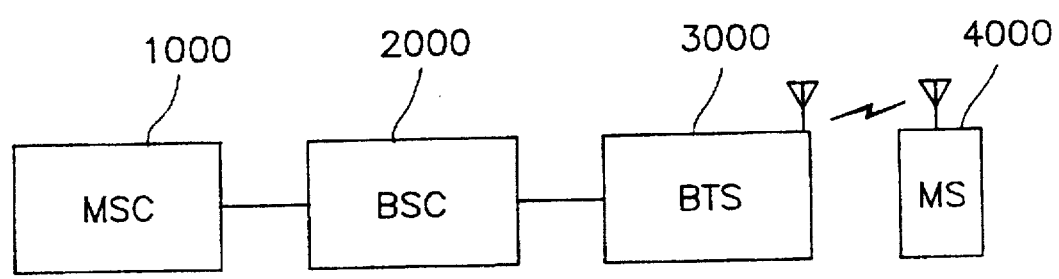
FIG. 1 is a structure diagram of the general CDMA mobile system.
Figure 2:
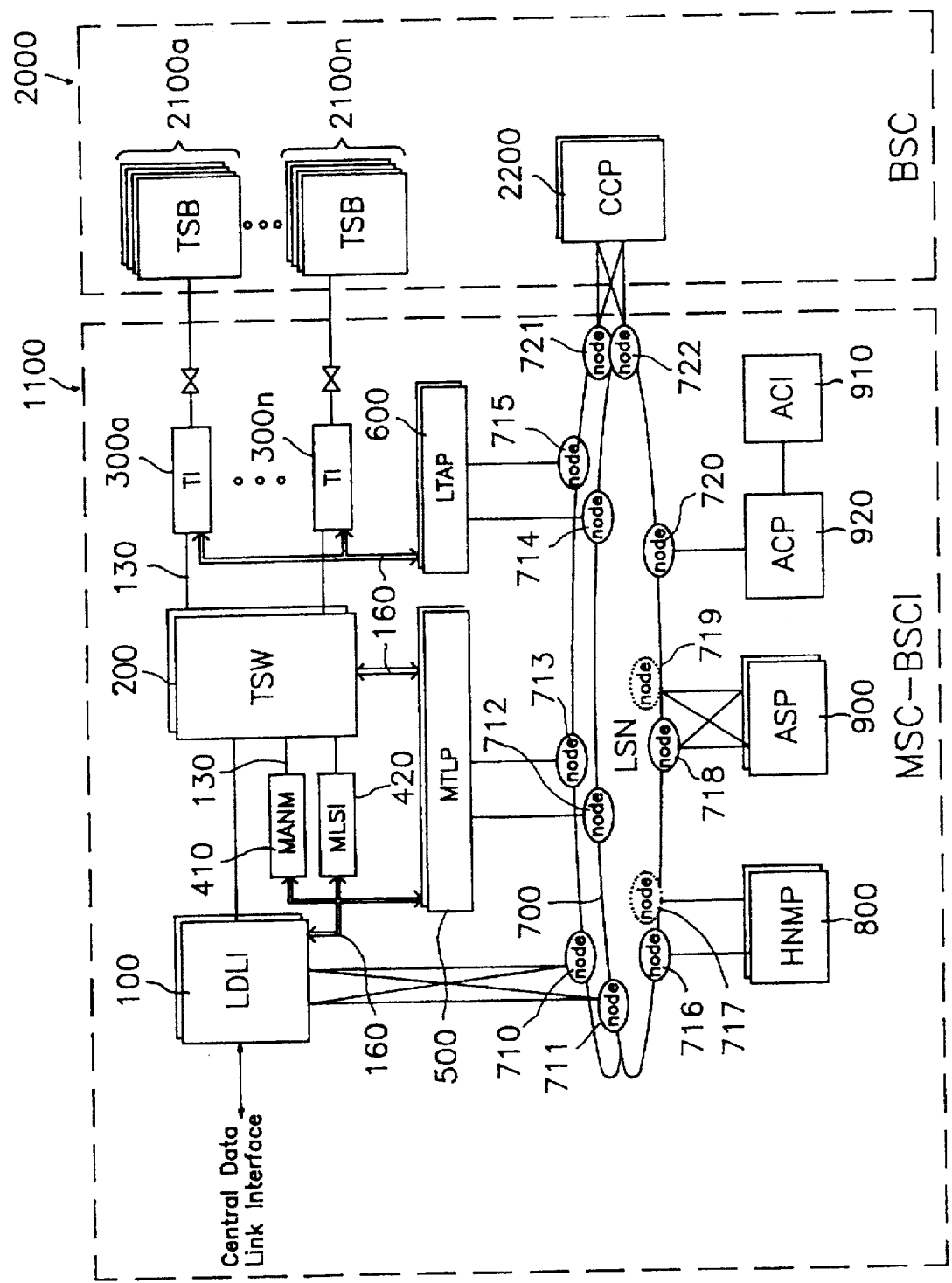
FIG. 2 is a structure diagram of the interface between the mobile switching center(MSC) and the base station controller(BSC) in the CDMA mobile system according to one preferred embodiment of the present invention.

FIG. 2 shows the base station controller interface of the mobile switching center of the present invention. The mobile switching center base station controller interface(MSC-BSCI) 1100 is built in the, mobile switching center which is connected to the base station controller as shown in FIG. 1.

Therefore, the base station controller interface 1100 of the mobile switching center of the present invention is comprised with the local data link interface(LDLI) 100, the time switch(TSW) 200, the trunk interface(TI) 300a ... 300n, the mobile announcement(MANM) 410, the mobile local service interface(MLSI) 420, the mobile time switch and local service processor(MTLP) 500, the line and trunk access processor(LTAP) 600, the local subsystem network(LSN) 700, the node 710 ... 722, the high speed network management processor(HNMP) 800, the access switching processor(ASP) 900, the alarm collection interface(ACI) 910, and the alarm control processor(ACP) 920 as shown FIG. 2.

In accordance with such a structure, the local data link interface 100 is connected to the central data link interface (not shown).

Also, said trunk interface 300a ... 300n is connected in correspondence with the transcoding and selecting bank 2100a ... 2100n of the base station controller 2000, respectively. A number of the local subsystem networks 700 can be constructed, and connected to the call control processor(CCP) 2200 of the base station controller 2000 through the nodes 721 and 722 of interest in correspondence with the number of the local subsystem network 700. At the same time, the local subsystem network 700 is connected to the local data link interface 100 through each of the nodes 710 and 711 included in the local subsystem network 700, and is also connected to the mobile time switch and local service processor 500 through the nodes 712 and 713.

The local subsystem network 700 is also connected to the line and trunk access processor 600 through each of the nodes 714 and 715 included in the local subsystem network 700, and is connected to the high speed network management processor 800 through each of the nodes 716 and 717.

The local subsystem network 700 is also connected to the access switching processor 900 through each of the nodes 718 and 719 comprising the local subsystem network 700, and is also connected to the alarm control processor 920 through the node 720.

Herein, the subordinate processor indicates the mobile time switch and local service processor 500, the line and trunk access processor 600, and the alarm follows.

First, the local data link interface 100 is provided with the communication path by interfacing the central data link interface through the logical and physical connection between the subsystems.

The local data link interface 100 is linked with the central data link interface in pairs, and thus is connected in the full duplex mode, and the greatest four interface pairs are symmetrically constructed.

The time switch 200 is connected by the cable to the subhighway 130 and is between the local data link interface 100 and a plurality of trunk interfaces 300a ... 300n, the mobile announcement 410, and the mobile local service interface 420.

The time switch 200 also anticipates the time slot converting function, the µ/A-law converting function, the A/µ-law converting function and the concentrating function which are performed by the mobile time switch and local service processor 500.

The time switch 200 also transmits the time switched sound and non-sound subscriber data to the local data link interface 100.

The trunk interfaces 300a ... 300n are linked with the TSBs 2100a ... 2100n of the base station controller 2000 through the E1 mode PCM line and trunk which is connected to each other the line and trunk access processor 600 and the time switch 200.

The trunk interface 300a ... 300n is transmitted to the network frame device in the system together with the alarm signal indicating the defect state of the PCM signal received by supplying a signal clock of 4.096 MHz and the frame signal clock of 8 KHz output from a time switch 200.

The trunk interface 300a ... 300n is also connected, in one byte serial mode, to the subordinate processor through the TD-bus 160 of the telephone device(TD)-bus controller (not shown) to send the message to the line and trunk access processor 600.

The trunk interface is connected to the local data link interface 100 and the time switch 200 through the sixteen bidirectional subhighways 130 to process the pulse code modulation transmission for and receiving data.

Then, the sixteen subhighways are operational by adding and subtracting the four subhighway units according to the number of the lines and trunks allocated by connecting the four subhighways per board.

The mobile local service interface 420 is operational by connecting the subhighway 130 cable to the time switch 200, and performs the local signal service function by controlling the mobile time switch and local service processor 500.

The mobile time switch and local service processor 500 transmits the initiation, the periodic look up of the operational state, the reoperational and the state look up result message of the local data link interface 100, the time switch 200, the mobile announcement 410, the mobile local service interface 420 to the access switching processor 900 through each of the nodes 712, 713, 718 and 719 of the local subsystem network 700.

The mobile time switch and local service processor 500 is connected through said local data link interface 100, the time switch 200, the mobile local service interface 420, the mobile announcement 410 and the TD-bus 160.

The line and trunk access processor 600 performs the function for transmitting the initiation, the periodic look up of the operational state, and the state look up result message of the trunk interface 300a ... 300n to the access switching processor 900 through each of the nodes 714 and 715 of the local subsystem network 700.

The local subsystem network 700 is connected to the local data link interface 100, the mobile time switch and local service processor 500, and the line and trunk access processor 600. The connected local subsystem network 700 includes a plurality of nodes 710 ... 722 for controlling the high speed inter-processor control(IPC) message exchange to perform the message exchange between a plurality of diversified processors.

Herein, each of the nodes is connected between the nodes to the system data and control bus(SDC-bus) by using one back board.

Such a system bus is constructed in triplicate and thus the stability theme is high, each of the nodes transmitting the IPC message to the data of the bit-stream mode, and the data transmission ratio of the system bus is 320 Mbps.

The network management processor 800 performs the look up function, the maintenance function, the IPC processing function and the arbitration signal outgoing function of the system bus which is connected to the local subsystem network 700.

The alarm control processor 920 processes an alarm which is transmitted through the local subsystem network 700 which is connected to the local subsystem network 700.

The access switching processor 900 controls the mobile time switch and local service processor 500, the line and trunk access processor 600, and the alarm control processor 920, conducts management for the state and the accounting of the subscriber of line and trunk of each of the subsystem, and performs the message transmission to process the mobile call and the fixed call.

The operation of the base station controller interface of the mobile switching center and the detail operation of the structural elements will be described as follows.

The local data link interface 100 which is able to transmit and receive, at a high speed, the message to other subsystem in the mobile switching center is connected to the time switch 200 as the link for providing the communication path through the logical and physical connection between the subsystems.

If such a local data link interface 100 transmits the time switched sound and non-sound subscriber data to the space switch through the central data link interface path, the data is exchanged by the space switch, and data is supplied between the time switches.

Then, the provided communication path has logically distinguished the channel for the communication between the telephone channel and the subsystem to the subscriber, one central data link interface and the local data link interface 100 is linked in pairs, and thus are connected in the full duplex mode, and the greatest four local data link interfaces 100 can be symmetrically constructed.

Herein, the space switch is made to exchange the time slot in one stream to the same slot in another stream by connecting to each other a plurality of time switches and the space matrix.

The local data link interface 100 is the link introduced into the optic transmission conception, in which it is freely able to displace the system because each network built between the subsystems is connected between point-to-point by using the optic fiber.

Therefore, the local data link interface 100 is interfaced with the central data link interface in the line bit ratio of 131.072 Mbps after the data of the source bit ratio of 65.536 Mbps is coded the code mark inversion code, and interfaces the time switch 200 with the data stream of 8.192 Mbps. The local data link interface 100 is to interface with the local subsystem network 700 in the data stream of the bit ratio of 1024×n(n=1, 2, 4, 8) Mbps.

The time switch 200 is connected to the mobile local service interface 420, the mobile announcement 410 and the trunk interface 300a . . . 300n at the same time to perform the time slot converting function, the µ/A-law converting function, the A/µ-law converting function and the concentrating function.

The time switch 200 connects the transmission and receiving subhighway 130 to the trunk interface 300a . . . 300n and the mobile local service interface 420, and thus receives the digital signal from the receiving subhighway.

The time switch 200 which receives the digital signal outputs the digital signal to the transmission highway after the time slot converting function and the concentrating function are performed. Then, the output to the subhighway from the highway is performed in reverse order.

Generally, the time switch 200 transmits and receives the subscriber telephone channel data to the subhighway 130 which is initiated and controlled by the mobile time switch and local service processor 500.

The time switch 500 sends the subscriber channel data which is temporarily stored in the sound memory by the control of the control memory as the data which the time slot is exchanged.

In order to send such data in which the time slot is exchanged, the time switch 200 includes the time slot converting function board and the service device for performing the multiplexing/demultiplexing function and the inner bidirectional time slot converting function of the 1K time slot, and the control memory and the maintenance board etc. for performing the intra call interfacing function, the time slot converting function, the board controlling function the self testing function and the maintenance function in the time switch.

The trunk interfaces 300a . . . 300n are the device for interfacing the E1 mode PCM line and trunk with the TSBs 2100a . . . 2100n of the base station controller 2000, in which it transmits and receives the subhighway data of the same 2.048 Mbps ratio as that of the time switch 200. The trunk interface receives the clock signal of 4.096 MHz and the frame synchronous signal from the time switch 200.

The trunk interface transmits to the system network frame device together with the alarm signal indicating whether or not it receives the clock signal of 2.048 MHz and the clock signal of 8 KHz which are extracted from the PCM signal of the relative station to use as the reference of the system network synchronous clock.

The trunk interfaces 300a . . . 300n are also connected in the serial mode of one byte data through the TD-bus 160 which is the message connecting bus between the subordinate processor and the device of the full electronic telephone exchanger(TDX-10) to exchange the message to the line and trunk access processor 600.

The trunk interface is connected by the sixteen bidirectional subhighways to the local data link interface 100 and the time switch 200 to process the PCM transmission and receiving data.

Such connected trunk interface receives the frame synchronization of 8 KHz and the clock signal of 4.096 MHz which are necessary to the trunk interface.

The sixteen subhighways which provide the 2.048 Mbps serial PCM data service of the thirty channel are operational by adding and subtracting the four subhighway units according to the number of the line and trunk which are allocated by connecting the four subhighways per board. Also, the sixteen subhighways extract the clock signal of 2.048 MHz from the signal which is received through the line and trunk which is connected to another station.

The mobile local service interface 420 is universally used to the full electronic telephone exchanger, and has the outgoing function and the detecting function of a kind of signal to process the call access.

The service function of the signal which is processed in the mobile local service interface 420 is the R2 multifrequency compelled signal transmission and receiving function to exchange information between the mobile switching stations using the channel associated signaling(CAS) mode, the dual tone multifrequency(DTMF) signal receiving function from the push button subscriber, the DTMF signal generating function to test the DTMF signal receiving function, the audio signal tone outgoing function for alarming or informing the call interface and the progressive state in the exchanger to the subscriber, and the function for transmitting and receiving the sequential testing signal to confirm whether or not normality between the switching stations using the common channel signaling mode is present.

The mobile local service interface 420 has the duplex structure of the load dispersion and the n+K.

The mobile local service interface 420 having such a structure receives the channel information and the performing functional information mode by way of the mobile time switch and local service processor 500, and then performs the function for transmitting the functional information defined every channel to the time switch 200 through the subhighway.

The service interface 420 performs the function for informing the mobile time switch and local service processor 500 after it is received and detected the PCM data input through the time switch 200 for every channel.

The mobile announcement 410 indicates the defective condition of the call connection of the telephone subscriber by a certain announcement during processing the call, or is the apparatus for performing the specific function including the announcement which the subscriber is away from home, a designated timing alarm etc.

A class of the service which the mobile announcement 410 provides is generally designed to be at least thirty-two classes, and a class of one time slot is required to provide the subhighway 130 from the time switch 200 for providing the service.

The mobile time switch and local service processor 500 includes the same hardware as that of the line and trunk access processor 600.

The inner function of the mobile time switch and local service processor 500 can be divided into the four telephone device buses(TD-bus) for transmitting and receiving the data between the subordinate processor and the device, the CPU (MC 68030) and the memory for providing the subordinate processor operating system(OS) program and the application program operation in use, and a portion for connecting the subordinate processor 900 to the subsystem network to exchange the message.

The TD-bus 160 can be reset in the device by using all bits on the TD-bus if it is abnormally operational by periodically inspecting the initiation of the local data link interface 100, the time switch 200, the mobile announcement 410 and the mobile local service interface 420, and the operational condition of each of the hardware.

Such TD-bus 160 can be reoperational in accordance with said local data link interface 100, the time switch 200, the mobile announcement 410 and the mobile service interface 420 by resetting the device.

The TD-bus 160 also informs the access switching processor 900 of a result of the condition of each device through the local subsystem network 700.

Then, the user application program of the access switching processor 900 transmits the state result of the device of interest to the local data link interface 100 through the gateway of the subsystem to output it to the monitor of the operator.

The connection to the local subsystem network 700 is able to connect at least 2.5 Mbps ratio, and the TD-bus and the network connecting method is used to the differential drive of the RS 422 mode.

The message process which is transmitted and received from the local subsystem network 700 has had to be in charge of the transmission and receiving of the message using the multicontrol communication controller(MPCC) and the MC68450 DMA to minimize the load of the processor.

The subordinate processor can be generally operational in the same duplex from as that of the load sharing and active standby.

The subordinate processor performs the control of the device by receiving all of the control signals from the access switching processor through the local subsystem network, or is the controlling processor which functions to transmit in the IPC form the device condition through the local subsystem network.

In the local subsystem network 700, each processor uses the mode in charge of the high speed message exchange to effectively perform the IPC message exchange between a plurality of diversified processors.

Each of the nodes performs the physical unit to link(U-Link) an interfacing function to the processor of interest and another corresponding block, the function for transmitting the message which is received from the relative side to the system data and control bus(SDC-bus) through the U-link, and transmitting the message which is input to the system data and control bus(SDC-bus) to the U-link, and the function for sensing the inner defect of the node.

The system data and control bus(SDC-bus) of the local subsystem network 700 is the common bus for interfacing the nodes 710 ... 722 in one local subsystem network 700 with each other.

The IPC message transmission and receiving between the nodes is accomplished through the system data and control bus. The signal on the system data and control bus is sent in triplicate to maintain the high reliance of the system.

At the same time, the condition of the system data and control bus has had to be inspected by the high speed network management processor 800.

The node to transmit the IPC message transmits the IPC message as the data of the bit stream form together with the synchronous clock which is necessary to transmit the data.

Then, the data transmission ratio of the system data and control bus is 80 Mbps, each node is connected to the system data and control bus which is the common bus, so that the arbitration of the system data and control bus is needed.

Therefore, the arbitration between the nodes is accomplished by the round robin discipline of a same kind.

The arbitration of each of the nodes is determined by the occupied counter of each of the node to occupy the system data and control bus based on the asserted clock to be provided from the network management processor 800 and the mounting position of the node.

If the counter value of the node and the node occupiable allowance signal accord with each other As being determined to be the occupied counter of each node, the node of interest is occupied by the D-bus. Then, other nodes stop increasing the occupying counter.

If in the network management processor 800, it is the counter to get to the maximum counter value according to the mounting of the node, the counter of each node is transmitting the system frame sink from the full node, and thus the counter value of all the nodes is zero.

The network management processor 800 is divided into the system data and control bus look up function, the maintenance function, the IPC processing function, the arbitration associated signal outgoing function etc. Herein, the system data and control bus look up function compares with each of the signal of the tripled system data and control bus(SDC-bus), distinguishes the defect generating bus, and then informs the subscriber. The maintenance function is in charge of the function for transmitting and receiving the state of each node, i.e. the test associated data in testing each of the node using the protocol of the half-duplex mode to exchange an information between the network management processor 800 and each of the node, and can be transmitted up to the maximum transmission ratio of 1 Mbps.

The IPC processing function is the function for testing the IPC link state of each of the nodes 710 ... 722, and communicating the network management processor of other subsystem, and the function for transmitting the maintenance associated message to the processor of another block. Also, the arbitration associated signal outgoing function is the function for transmitting the arbitration clock signal of 5 MHz and the frame sink(FS) to the system data and control bus(SDC-bus).

The access switching processor 900 controls the subordinate processor in the subsystem, i.e. the mobile time switch and local service processor 500, the line and trunk access processor 500, and the alarm control processor 920.

Also, the access switching processor 900 manages the state management of the subscriber of each of the subsystem, and the line and trunk, the accounting data management et al.

A kind of the general mobile call process according to the access switching processor is divided into the six kinds including the local mobile subscriber call to the local mobile subscriber trunk, the remote mobile subscriber call to the local mobile subscriber trunk, the remote fixed subscriber call to the local mobile subscribes trunk, the local mobile subscriber call to the remote mobile subscriber trunk, the local mobile subscriber call to the remote fixed subscriber trunk, the remote mobile subscriber call to the remote fixed subscriber trunk etc.

If the access switching processor 900 receives the message for communication between the processors through the node to process the call in the base station controller 2000 as the call set up message, the access switching processor is processed by first translating whether the received subscriber is the mobile subscriber or the general remote subscriber.

The access switching processor 900 transmits the result processed as mentioned hereinabove to the number translator, the location information processing application processor etc.

As mentioned hereinabove, the present invention provides the base station controller interface of the mobile switching center to communicate between the mobile switching center and the base station controller, in which it decreases the load of the system by comprising for, every base station controller interface, the mobile announcement(MAMM), and the effect is to decrease generating the defect of the mobile announcement.

At the same time, the base station controller interface of the mobile switching center according to the present invention uses the connection between the mobile switching center of the base station controller and the base station controller interface using the EL 2048 Kbps interfacing technique applying the conventional communication network recommended in the ITU-T.

The transmission of the message and the call traffic using such interfacing technique is performed to be linked with the TSB of the base station controller, the control signal for processing the call is accomplished by using the inner communication message protocol which is connected in the EIA-422 interfacing mode to the call control processor of the base station controller.

Therefore, the present invention has an effect for effectively performing the call processing function to the mobile subscriber, the mobility management function, the mobile subscriber announceable function, and the itself operational preservative function.

Therefore, the present invention increases the capacity of the subsystem in the conventional full electronic telephone exchanger, and has an effect to easily embody the subsystem in the mobile switching center for the more economical connection thereof.

While the foregoing discloses the preferred embodiment of the invention, it is to be understood that many changes in the detail may be made as a matter of engineering choices without departing from the spirit and scope of the invention as defined by the appended claims. Therefore, all such changes, modification, variations, and other uses and application which do not depart from the spirit and scope of this invention are deemed to be covered by this invention, which is limited only by the claims which follow.

What is claimed is:

1. A CDMA mobile system base station controller interface which is disposed between a CDMA mobile switching center and a base station controller, said base station controller interface comprising:

a local data link interface for providing a communication path which is interfaced with a central data link interface in said mobile switching center through a connection between subsystems in said mobile switching center;

a time switch for connecting said local data link interface to a trunk interface, a mobile announcement, and a mobile local service interface, to thereby perform a time slot converting function, a μ/A-law converting function, a A/μ-law converting function and a concentrating function in a mobile time switch and local service processor, and thus transmit the subscriber data of the time switched sound and non-sound back to said local data link interface;

a plurality of trunk interfaces linking said time switch to a transcoding and selecting bank of said base station controller through an E1 mode PCM line and trunk which is connected to said time switch, and to the line and trunk access processor, said trunk interfaces being provided for performing an interfacing function to the base station controller to transmit an alarm signal indicating a defect state of a received PCM signal by supplying a clock signal of 4.096 MHz and a frame clock signal of 8 KHz output from said time switch to a synchronous network frame device in the system;

said mobile announcement for performing the mobile announcing function connecting said local data link interface and said time switch;

a mobile local service interface for providing a call processing tone with the mobile subscriber for every paging of each mobile call by connecting said local data link interface and said time switch respectively;

said mobile time switch and local service processor for for transmitting an initiative function, a periodic look up function, a reoperational function, and looking up of a state result message of said local data link interface, said time switch, said mobile announcement, and said mobile local service interface;

said line and trunk access processor for transmitting the initiative function, the periodic look up function, the reoperational function and the state look up result message of said PCM line and trunk interface;

a local subsystem network connected to said local data link interface, said mobile time switch and local service processor, and said line and trunk access processor, and said local subsystem network being connected to a number of the nodes to control the high speed interprocessor communication (IPC) message exchange to perform the high speed message exchange between a number of the diversified processors;

a high speed network management processor for performing the system bus look up function, the maintenance function, the IPC processing function and an arbitration associated signal outgoing function, said high speed network management processor being connected said local subsystem network;

an alarm control processor for processing the alarm transmitted through said local subsystem network, being connecting to said local subsystem network; and an access switching processor for controlling said switch and said mobile time switch and local service processor, said line and trunk access processor, and said alarm control processor, said access switching processor performing management for the state and the accounting data of the subscriber or the line and trunk, and transmitting the message to process a frame call and the call.

2. A base station controller interface of the CDMA mobile switching center as in claim 1, wherein said local data link interface is linked with the central data link interface in pairs, and thus is connected in a full duplex mode.

3. A base station controller interface of the CDMA mobile switching center as in claim 2, wherein said local data link interface is symmetrically comprised of four interface pairs.

4. A base station controller interface of the CDMA mobile switching center as a claim 1, wherein said local data link interface is interfaced with said central data link interface in a line bit ratio of 131.072 Mbps after data of the source bit ratio of 65.536 Mbps is coded the code mark inversion code, and interfaced with said time switch in a data stream of 8.192 Mbps, and interfaces with said local subsystem network in a data stream of a bit ratio of 1024×n(n=1, 2, 4, 8) Mbps.

5. A base station controller interface of the CDMA mobile switching center as in claim 1, wherein said time switch connects a transmission and receiving subhighway to said trunk interface, said mobile announcement and said mobile local service interface.

6. A base station controller interface of the CDMA mobile switching center as in claim 1, wherein said trunk interfaces receive a clock signal of 4.096 MHz and a synchronous frame signal from said time switch, and transmits to the system network frame synchronous device together with an information signal indicating whether or not it receives a clock signal of 2.048 MHz and a clock signal of 8 KHz extracted from the PCM signal of the relative station to use as the reference of the system network frame clock.

7. A base station controller interface of the CDMA mobile switching center as in claim 1, wherein said trunk interfaces are connected in a serial mode of one byte data through said mobile time switch and local service processor, said line and trunk access processor, and said alarm control processor to exchange the message to the line and trunk access processor, and said trunk interfaces link said local data link interface and said time switch with a sixteen bidirectional subhighway to process the PCM transmission and receiving data.

8. A base station controller interface of the CDMA mobile switching center as in claim 7, wherein said sixteen subhighway which provides the 2.048 Mbps serial PCM data service for thirty channels is operational by adding and subtracting four subhighway units according to the number of the line and trunk which is allocated by connecting four subhighways per board.

9. A base station controller interface of the CDMA mobile switching center as in claim 1, wherein said mobile time switch and local service processor is connected to said local data link interface, said time switch, said mobile announcement, said mobile local service interface, and said TD-bus.

10. A base station controller interface of the CDMA mobile switching center as in claim 9, wherein said TD-bus is accompanied with said differential drive of an RS 422 mode.

11. A base station controller interface of the CDMA mobile switching center as in claim 1, wherein said mobile time switch and local service processor is accompanied with the connection to said local subsystem network with said differential drive of an RS 422 mode.

12. A base station controller interface of the CDMA mobile switching center as in claim 1, wherein each of the nodes of said local subsystem network is accompanied with the signal for transmitting the TD-bus in triplicate.

13. A base station controller interface of the CDMA mobile switching center as in claim 12, wherein each of said nodes transmits an IPC message as a data of the bit stream form.

14. A base station controller interface of the CDMA mobile switching center as in claim 13, wherein the data transmission ration of said TD-bus is 80 Mbps.

15. A base station controller interface of the CDMA mobile switching center as in claim 1, wherein said mobile announcement is in found in every subsystem of said base station controller.

16. A base station controller interface of the CDMA mobile switching center as in claim 1, wherein said mobile local service interface is found in every subsystem of said base station controller.

17. A base station controller interface of the CDMA mobile switching center as in claim 1, wherein said alarm control processor is added to said alarm collection interface for collecting the alarm of the subsystem.

\* \* \* \* \*